Aug. 31, 1948.  J. D. MATTIMORE ET AL  2,448,107
METHOD AND APPARATUS FOR MAKING WELDED PIPE JOINTS
Filed Feb. 22, 1945
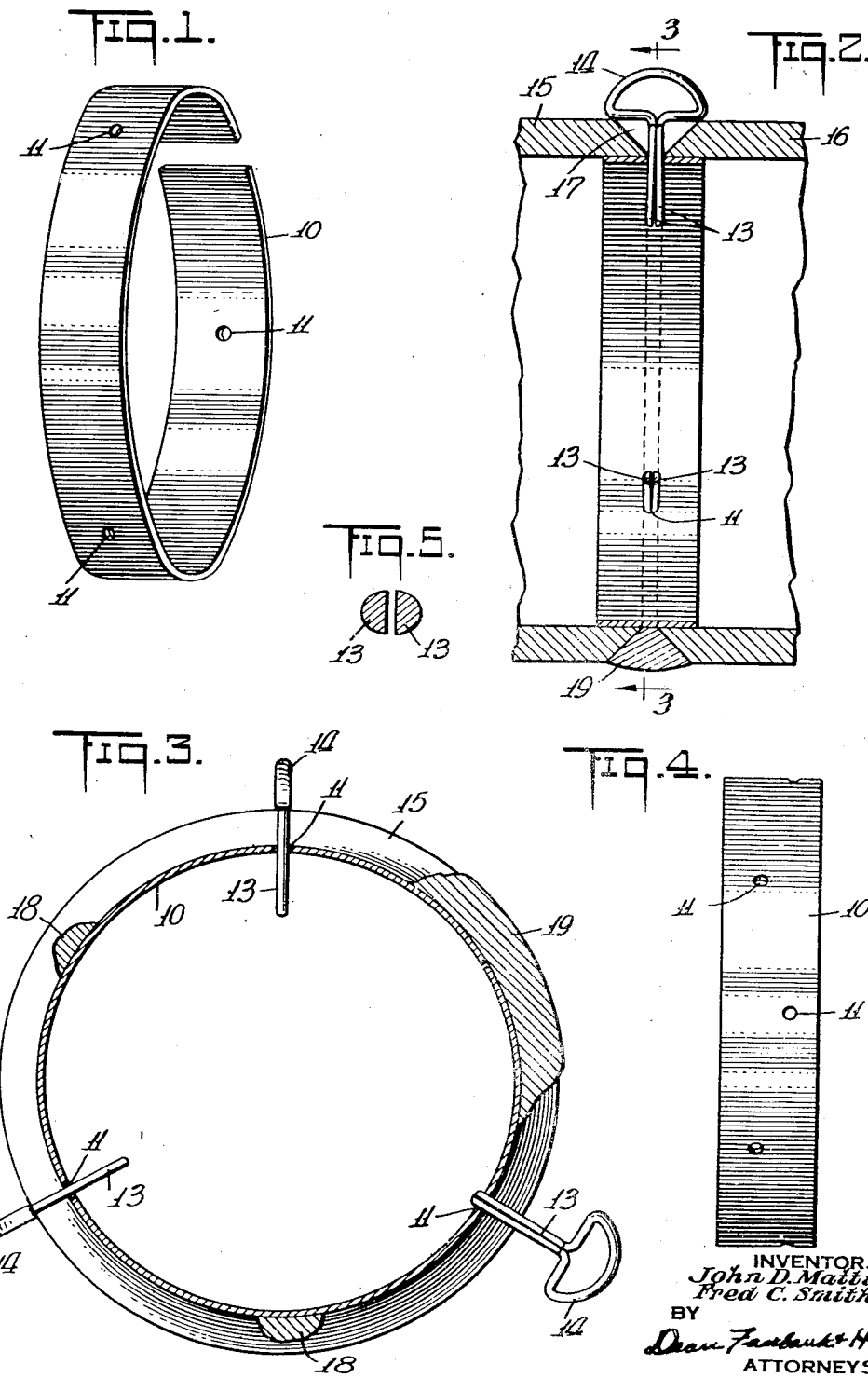
INVENTORS
John D. Mattimore
Fred C. Smith
BY
Dean Fairbank & Hirsch
ATTORNEYS Patented Aug. 31, 1948

2,448,107

UNITED STATES PATENT OFFICE 2,448,107

METHOD AND APPARATUS FOR MAKING WELDED PIPE JOINTS

John D. Mattimore and Fred C. Smith, Louisville, Ky., assignors to Tube Turns, Inc., a corporation of Kentucky Application February 22, 1945, Serial No. 579,296

12 Claims. (Cl. 285—111)

This invention relates to butt welding of tubes, pipes, or other tubular members, and more particularly to such welds as are accomplished with the aid of welding rings telescoped within the adjacent ends of the members to be welded.

In such welding of tubular members, it has been proposed to provide a welding ring, which may be split so as to be expansible or contractible into snug engagement with the inner surface of the tubular members, to prevent the formation of icicles of metal, slag, or both, on the interior walls of the tubular members during welding. It has also been proposed to provide such a ring with an annular flange or a series of studs or projections around the periphery of the ring, intermediate the side edges thereof, and against which the ends of the tubular members may abut so as to space said ends to predetermined distance and to facilitate the accurate alignment of the tubular members.

Such flanges, studs, or the like on welding rings as heretofore employed, are partially melted in the welding operation and are incorporated, at least in part, in the welded joint. It has been found that this frequently results in non-uniform welds, particularly in those cases where the studs or other spacing elements are of different material than the welding ring or the weld metal, since in such cases undesirable contamination of the welded joint occurs. Furthermore, such permanently attached studs or flanges make it difficult or impossible to obtain complete fusion at their bases. When the weld is tested by radiography or back-bending, the incompletely fused zones show up as cracks which frequently cause rejection.

Among the objects of the present invention are to reduce the cost of such welding rings and spacers; to avoid melting or otherwise incorporating any part of the spacing elements in the weld, thereby avoiding contamination and non-uniformity of the weld; to provide spacing elements that are easily removable so that they may be employed repeatedly in the making of a number of different welded joints; to simplify the packing and shipping of the welding rings and the spacing elements; and to render their assembly at the place of use rapid, easy and accurate.

In the practice of the present invention, there is provided a simple strip of sheet metal which is bent to substantially cylindrical or ring form, and which is somewhat expansible or contractible to facilitate fairly snug fit in the ends of the tubular members to be welded together. The ring is provided with circumferentially spaced holes intermediate of its edges, and in which spacers may be easily and quickly inserted. The spacers are so formed that they are frictionally held in the holes and will not fall out during use, but may be easily pulled out of the ring in advance of welding at the respective locations of the holes and spacers.

Upon assembling the tubular members and the ring with the spacers inserted therein, the ends of the tubular members telescoped over the ring may be brought snugly against the spacers to provide uniform spacing and proper alignment, and the operator may then tack weld the tubular members and ring together at a few points between successive spacers and then pull out the spacers and finish the weld. The preferred procedure is to make the initial tack weld at the gap in the split ring. The remaining tacks should be made by progressively withdrawing the spacer pins and making the tacks at the holes thus left open. The full welding beads can then be laid in any manner desired. Alternatively, the operator may make the weld along a section of the joint between two spacers and then pull out the spacers successively around the ring as the welding progresses circumferentially around the joint, each spacer being pulled out just before the welding operation reaches the location of the spacer. The spacers are thus available for insertion in other rings for making other joints, and therefore the operator need be provided with only enough of the spacers to form a single joint. As previously indicated, the rings are simple sheet metal strips bent into circular form, and provided with holes punched therein at the proper spaced intervals.

In the accompanying drawings:

Fig. 1 is a perspective view of the welding ring;

Fig. 2 is a section through the ring and spacers while in use, and with a portion of the weld completed as shown in the lower side of the figure;

Fig. 3 is a section on the line 3—3 of Fig. 2;

Fig. 4 is a side view of a ring similar to that shown in Fig. 1, but with the holes staggered transversely of the ring; and Fig. 5 is a cross-section through one of the spacing elements.

The welding ring 10 may be constructed, as shown in Fig. 1, of a strip of sheet metal bent to substantially cylindrical form, and slightly expansible due to the resiliency of the metal, so that the ring may be contracted and inserted within the ends of pipes or other tubular members to be welded. This ring is provided with a plurality of holes 11 at spaced points around the circumference thereof, and preferably midway between the side edges of the ring. In order to insure proper alignment of the tubular members, there should be provided at least three such holes at approximately equally spaced intervals around the ring, but a larger number of holes may be provided if desired.

In connection with this welding ring there are provided spacer elements for insertion within the holes 11 and readily removable therefrom. The spacer elements should fit friction tight, and should be of such a length that when one end is inserted in a hole 11, the other end will extend out to a greater distance than the thickness of the tubular members to be welded together. It is also preferable that such spacer members have enlarged heads so that they may be readily grasped in pulling them out, and for rotating them in the hole if desired.

A preferred form of spacer element for carrying out the present invention is a cotter pin having a body portion formed of two substantially parallel semi-oval legs 13 and a loop 14 integral therewith. The metal forming the cotter pin is somewhat resilient and the legs will normally tend to spread apart to a slight extent and their ends may be somewhat beveled or tapered so as to facilitate the insertion of the pin in the hole 11.

When the legs of the cotter pins are half-rounds and have very small diametrical clearance in the holes in which they fit, the thermal contraction of the tack welds may cause the pipe ends to seize the pins and make difficult their removal. When the legs are made half-oval with their long axis parallel to the axis of the pipe while the tacks are made, as shown in Fig. 5, it has been found that they can be readily rotated and then easily withdrawn in spite of the gripping effect of the contracted pipe ends.

In use, the welding ring is slightly collapsed and inserted within the end of one pipe or tubular member 15, and the other pipe or tubular member 16 is telescoped onto the welding ring. These pipe ends usually are beveled so as to form an annular groove 17 to receive the welding metal employed for making the joint.

The spacers are inserted in the holes of the welding ring preferably before assembly with the pipe ends, and the pipe ends are telescoped over the ring and pushed toward each other so that they engage the spacers. Thus the pipes are held in alignment and at a predetermined distance apart. The pipe ends and the ring are tack welded as above described after the spacing elements are removed in succession. Then the welding bead may be started at any point along the annular groove and continued progressively along said groove and around to the point of starting. As the point of welding approaches one of the spacers it is pulled out and the welding then continued up to the next spacer, which in turn is pulled out, and so on until the joint is completed. As an alternative procedure the two pipe ends may be tack-welded together at two or more points between spacers, and then all of the spacers withdrawn and the welding completed. In Fig. 3 we have shown two such tack-welds 18, and have shown a portion of the complete weld 19.

The heads 14 of the spacers are preferably of such size and shape that they will rest upon the outer surface of the pipes 15 and 16 as shown in Fig. 2, so that when placed in radial longitudinal planes they do not enter the groove and extend out sufficiently far to facilitate easy grasping and removal. The holes 11 are circular in cross-section, but the body portion of the spacer, when the legs are close together, is preferably elliptical in cross-section, and has its greatest diameter lengthwise of the welding ring. Thus the spacers, even if tightly gripped by the pipe ends, may be rotated 90° and freed from contact with the pipe ends, and the only frictional resistance to the removal of the spacers will be the contact of them with the welding ring itself.

In case a wider joint is desired the welding ring may be provided with two annular rows of the holes 11, as shown in Fig. 4, so that one pipe end will engage with the spacers in one annular row of holes and the other pipe end engage with the spacers in the other row of holes.

As each spacer is removed before the weld is made at the location of the spacer, the spacers are not incorporated in the weld, thus avoiding contamination of the weld metal and insuring a weld of uniform composition. Also, danger of incomplete fusion of the spacers with the attendant disadvantages as sometimes encountered with spacer-type welding rings heretofore employed, is entirely eliminated. Among the further advantages of our improved welding ring and welding procedure, are that the spacers may be reused, the cost is reduced, and the welding rings may be packed in smaller space and shipped to the place of use without the liability of bending or breaking off the spacers which may occur where the spacers are permanently secured to the rings.

Having thus described our invention, what we claim as new and desire to secure by Letters Patent is:

1. The method of butt welding the ends of tubular members with a welding ring therein, which consists in assembling said members in alignment with the ends of the members telescoped over a welding ring provided with a plurality of separate spacers against which the ends of said tubular members abut, all of said spacers being frictionally retained in said rings and readily and completely removable intact for reuse, welding said ends together by depositing welding metal in the space between said ends and removing each spacer prior to said welding at the location of said spacer, whereby said spacers are not melted or incorporated in the welded joint.

2. The method of butt welding the ends of tubular members with a welding ring therein, which consists in assembling said members in alignment with the ends of the members telescoped over a welding ring provided with a plurality of separate spacers against which the ends of said tubular members abut, all of said spacers being frictionally retained in said rings and readily and completely removable intact for reuse, tack welding the ends of said members together at spaced points around the ring, removing the spacers, and welding said ends together by depositing welding metal in the space between said ends, whereby said spacers are not melted or incorporated in the welded joint.

3. The method of butt welding the ends of tubular members with a welding ring therein, which consists in assembling said members in alignment with the ends of the members telescoped over a welding ring provided with a plurality of separate frictionally retained and completely and readily removable spacers against which the ends of said tubular members abut, pulling out each spacer, tack welding the ends of said tubular members together at the place from which the spacer was removed, and welding said ends together by depositing welding metal in the space between said ends and progressively around said ring, whereby said spacers are not melted or incorporated in the welded joint.

4. The method of butt welding the ends of tubular members with a welding ring therein, which consists in assembling said members in alignment with the ends of the members telescoped over a welding ring provided with a plurality of separate frictionally retained and completely and readily removable spacers against which the ends of said tubular members abut, welding said ends together by depositing welding metal in the space between said ends and progressively around said ring, and pulling out said spacers in succession as said welding proceeds circumferentially around the joint, whereby said spacers are not melted or incorporated in the welded joint.

5. An assembly for forming a welded joint, said assembly comprising two tubular metal members having the ends to be welded together spaced apart, a metal welding ring telescoped within the ends of said members and bridging the space therebetween, said ring having openings therein spaced around the circumference thereof and intermediate of the edges thereof, and spacers frictionally retained in and quickly removable from said openings for spacing the ends of said tubular members, whereby each spacer may be removed in advance of the welding at the location of the spacer.

6. A welding ring adapted to be telescoped within the juxtaposed ends of tubular members, for spacing and aligning said ends and preventing icicles while they are being welded together, said ring having a plurality of holes spaced apart around the circumference thereof and between the edges thereof, and a series of spacing elements frictionally retained in said holes for spacing said ends apart, said spacing elements being readily and completely removable from said holes after the welding operation has been begun between successive spacing elements, whereby said elements do not become incorporated in the weld and may be reused with another ring.

7. A welding ring adapted to be telescoped within the juxtaposed ends of tubular members for spacing and aligning said ends while they are being welded together, said ring having a plurality of holes spaced apart around the circumference thereof and between the edges thereof, and a series of spacing elements frictionally retained in said holes for spacing said ends apart, said spacing elements being readily and completely removable from said holes, whereby said elements do not become incorporated in the weld and may be reused with another ring, said spacing elements having relatively large head portions limiting the extent to which said elements may be inserted in said holes.

8. A welding ring adapted to be telescoped within the juxtaposed ends of two tubular members to be welded together, said ring having a plurality of holes located intermediate the side edges of the ring at spaced intervals around the circumference of the ring, and a plurality of spacing elements frictionally retained in and projecting outwardly from said holes to a greater distance than the outer surface of said tubular members, for spacing apart the ends of the tubular members to be welded, said spacing elements being readily and completely removable from said openings.

9. A welding ring adapted to be telescoped within the juxtaposed ends of tubular members while they are being welded together, said ring having a plurality of holes spaced apart around the circumference thereof and between the edges thereof, and a series of spacing elements frictionally retained in and projecting outwardly from said holes for spacing said ends apart, said spacing elements being readily and completely removable from said holes after the welding operation has been begun, whereby said elements do not become incorporated in the weld, said spacing elements having enlarged head portions extending beyond and adapted to rest on the outer surfaces of said tubular members.

10. A welding ring adapted to be positioned within the juxtaposed ends of tubular members while they are being welded together, said ring having a plurality of holes therethrough around the circumference thereof and between the edges thereof, and a series of spacing elements extending through said holes for spacing said ends apart, said spacing elements being readily removable from said holes after the welding operation has been begun, whereby said elements do not become incorporated in the weld, said spacing elements each including a body portion and elongated parallel extending legs resiliently biased so as to be relatively movable toward and from each other and to frictionally engage opposite sides of said holes.

11. A welding ring adapted to be positioned within the juxtaposed ends of tubular members while they are being welded together, said ring having a plurality of holes therethrough around the circumference thereof and between the edges thereof, and a series of spacing elements extending through said holes for spacing said ends apart, said spacing elements being readily removable from said holes after the welding operation has been begun, whereby they do not become incorporated in the weld, said spacing elements each being in the form of a cotter pin having parallel extending resiliently connected leg portions extending through and frictionally retaining the pin in a hole in said ring, and having a head portion which may be readily grasped for removal of said pin from said hole.

12. A welding ring for use in the welding together of the ends of tubular members, comprising an annular metal band having a plurality of holes located between the side edges thereof at spaced intervals around the circumference of the band, and a plurality of cotter pins insertable in and readily removable from said holes.

JOHN D. MATTIMORE.
FRED C. SMITH.

REFERENCES CITED

The following references are of record in the file of this patent:

UNITED STATES PATENTS

| Number | Name | Date |
| --- | --- | --- |
| 1,939,772 | Greene | Dec. 19, 1933 |
| 1,969,572 | Maurer | Aug. 7, 1934 |
| 1,980,561 | Wagner | Nov. 13, 1934 |
| 2,146,901 | Lane | Feb. 14, 1939 |
| 2,366,579 | Von Ahrens | Feb. 2, 1945 |